United States Patent [19]

Gill

[11] Patent Number: 5,764,431
[45] Date of Patent: Jun. 9, 1998

[54] MEDIA VELOCITY DETECTION FOR A CAPSTANLESS TAPE TRANSPORT

[75] Inventor: Richard A. Gill, Arvada, Colo.

[73] Assignee: Storage Technology Corporation, Louisville, Colo.

[21] Appl. No.: 243,491

[22] Filed: May 16, 1994

[51] Int. Cl.$^6$ ................................................. G11B 15/46
[52] U.S. Cl. ................................. 360/73.04; 360/73.01; 324/172
[58] Field of Search ...................... 360/51, 73.01, 360/73.04, 73.12; 377/20; 324/172, 173, 178, 179

[56] References Cited

U.S. PATENT DOCUMENTS

| | | | |
|---|---|---|---|
| 2,876,004 | 3/1959 | Sink | 360/73.13 |
| 3,582,781 | 6/1971 | Vemura | 360/73.01 |
| 3,596,005 | 7/1971 | Hamilton | 360/73.13 |
| 3,666,883 | 5/1972 | Yano et al. | 360/73.13 |
| 3,805,286 | 4/1974 | Kavanagh | 360/51 |
| 3,913,134 | 10/1975 | Sargunar | 360/73.04 |
| 4,870,643 | 9/1989 | Bultman et al. | 371/11.1 |
| 4,885,647 | 12/1989 | Sugiki et al. | 360/73.12 |
| 5,012,358 | 4/1991 | Kohsaka | 360/70 |
| 5,041,924 | 8/1991 | Blackborow et al. | 360/69 |
| 5,111,463 | 5/1992 | Zook | 360/48 X |
| 5,274,509 | 12/1993 | Buch | 360/51 |
| 5,285,327 | 2/1994 | Hetzler | 360/51 |
| 5,383,066 | 1/1995 | Kim | 360/73.01 |
| 5,491,594 | 2/1996 | Yamamoto et al. | 360/73.04 |

FOREIGN PATENT DOCUMENTS 0122081 5/1989 Japan.
02413789 12/1992 Japan.

OTHER PUBLICATIONS

R. C. Breltenbach, *Process for Measuring Magnetic Tape Velocity*, IBM Technical Disclosure Bulletin, vol. 12, No. 1, Jun. 1969.

*Primary Examiner*—Aristotelis M. Psitos
*Assistant Examiner*—Larry T. Cullen
*Attorney, Agent, or Firm*—Timothy R. Schulte

[57] ABSTRACT

An apparatus and method are disclosed for detecting the velocity of a tape in a tape transport system having a write head and a read head separated by a known distance and formatting the tape using marks. The tape transport system generates a write signal indicating when one of the marks is written to the tape by the write head and a read signal indicating when one of the marks is read from the tape by the read head. An accumulator determines the amount of time between the write signal and the read signal. A velocity detector determines the velocity of the tape based on said time determined by the accumulator and the known distance between the write head and the read head.

20 Claims, 12 Drawing Sheets

MEDIA VELOCITY DETECTION FOR A CAPSTANLESS TAPE TRANSPORT

BACKGROUND OF THE INVENTION

1. Field of the Invention

The present invention relates generally to tape transport systems, and more specifically to a system and method for determining the velocity of a tape in a capstanless tape transport system.

2. Related Art

Magnetic tape has long been used as a mechanism to store data for access by computers. Magnetic tape currently provides low cost access to large quantities of data in a non-volatile form. The magnetic tape is made from a thin polyester layer coated with a magnetic or ferro-magnetic material.

Basically, most tape transport systems are two-reel systems. There is a supply reel and a take-up reel. The supply reel supplies the tape to the transport system. The take-up reel is the reel upon which the tape is wound as it is pulled off of the supply reel and read from or written to by the transport system. In reel-to-reel transports, the supply reel is removable so that numerous tapes can be mounted on the tape drive.

Start-stop tape transports use a capstan to help overcome the inertia of the reel mass. With the capstan tape velocity can be accurately controlled. However, over time, the coefficient of friction of the capstan can decrease making tape slippage during acceleration more likely. Such slippage may cause erroneous recording of data. U.S. Pat. No. 3,805,286, to Bunker, describes one way in which such slippage can be detected.

Streaming tape transports, do not use a capstan to help control tape velocity. In this system, the tape is suspended between the two reels and, consequently, is directly controlled thereby. Systems such as this that do not use a capstan to control the speed are subject to error due to variations in the media velocity. To maintain accuracy, complex equations are used to determine velocity by computing ratios of tachometers attached to both reels. State of the art processors, high resolution tachometers, and complex algorithms do an excellent job at monitoring velocity.

SUMMARY OF THE INVENTION

The present invention is directed toward an apparatus and method for detecting the velocity of a tape in a tape transport system. The tape transport system has a read head and a write head, separated from each other by a known distance. A write formatter writes data to the tape and formats the data by writing marks such as sync marks and burst marks. For each mark written, the write formatter generates a write signal which is preferably a pulse. Preferably, the pulse is generated at substantially the same time the mark is written to the tape.

The recorded data and marks are sensed by the read head. A detector detects the presence of the marks and generates a read signal or pulse indicating that a mark was read.

An accumulator comprises a plurality of accumulator stages, which can be implemented using timers. Each time the accumulator receives a write pulse, an accumulator stage is started. The stage counts, or otherwise keeps track of the amount of time elapsed since receipt of the write signal and saves this time as a count value. When a read signal is detected, a velocity detector reads the count value stored in a timer stage and determines the velocity of the tape. The velocity is determined as a function of the time it took for a given mark to travel the known distance between the read and write heads.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

The present invention is directed toward a system and method for determining the velocity of a tape moving through a tape transport system. The invention utilizes marks recorded on the tape and determines the amount of time it takes for a mark to travel from the write head where it is written onto the tape to the read head where its presence on the tape is detected. Given a known distance between the read and write heads, the velocity of the tape can be determined by the amount of time it takes for the mark to travel the distance between heads.

Figures 1, 2:
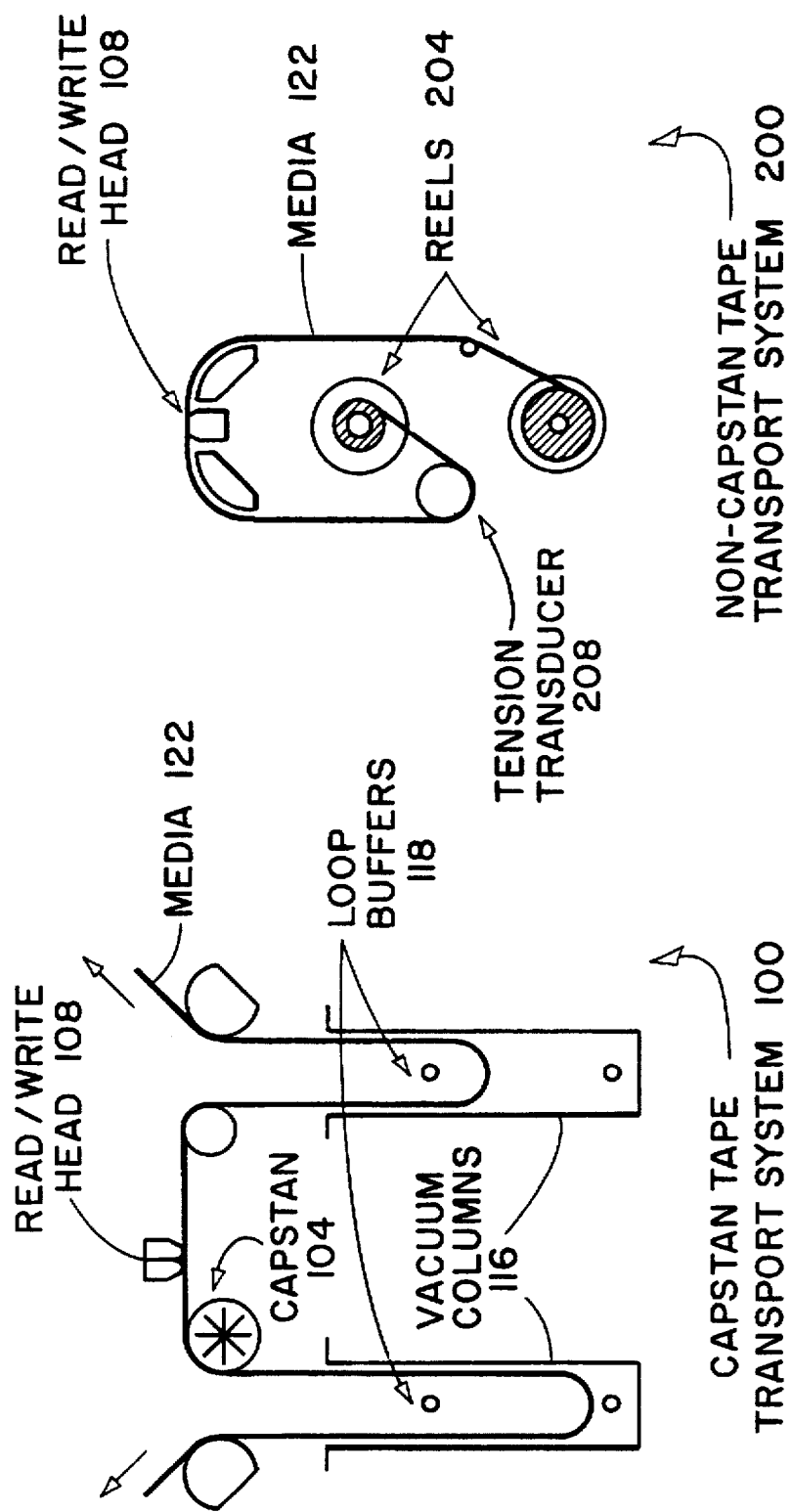
FIG. 1 is a diagram illustrating a tape transport system using a capstan.
FIG. 2 is a diagram illustrating a non-capstan tape transport system.

FIG. 1 is a diagram illustrating a tape transport system using a capstan. A capstan tape transport system 100 includes a capstan 104, a read/write head 108, vacuum columns 116, and loop buffers 118. The media 122 (for example, magnetic tape) onto which data is written is threaded through capstan tape transport system 100. Capstan 104 is used to control the velocity of media 122 across read/write head 108. Loop buffers 118 and vacuum columns 116 are used to accommodate for any slack caused by acceleration and/or deceleration of the tape reels. However, as far as the velocity of media 122 is concerned, the most important feature of capstan tape transport system 100 is the capstan 104 itself. The actual velocity of media 122 across read/write head 108 is controlled by capstan 104. One way that velocity is detected in a capstan tape transport system is fully disclosed in U.S. Pat. No. 3,805,286 to Kavanaugh et al., assigned to the Storage Technology Corporation.

FIG. 2 is a diagram illustrating a non-capstan tape transport system. An example of a non-capstan tape transport system is a streaming tape transport system. Non-capstan tape transport system 200 includes two reels 204 (a take-up reel and a supply reel), a tension transducer 208, and read/write head 108. The velocity of media 122 across read/write head 108 is controlled by the rate of revolution of reels 204. However, for a given rate of revolution of one of the reels 204, the actual velocity of media 122 across read/write head 108 depends on the amount of media 122 already wound on that reel 204. That is, as more tape is wound on a reel 204 and its effective diameter increases, the velocity of media 122 increases for a given revolution rate. Thus, complex equations are often used which consider the amount of tape on each reel 204 and the rate of revolution of each reel 204 to determine the actual velocity of media 122. Through the use of the velocity detection system of the present invention, the velocity of media 122 across read/write head 108 can be determined independent of the amount of tape on reels 204 and their rate or revolution.

As stated above, the present invention determines the amount of time it takes for a given mark, or set of marks, on media 122 to travel the distance between the read head and the write head. Given the amount of time it takes for the mark to traverse this known distance, the rate of travel of media 122 is determined. In an alternative embodiment, the actual rate of media 122 is not determined; instead, it is determined whether the rate of media 122 is above or below an acceptable range.

Figure 3:
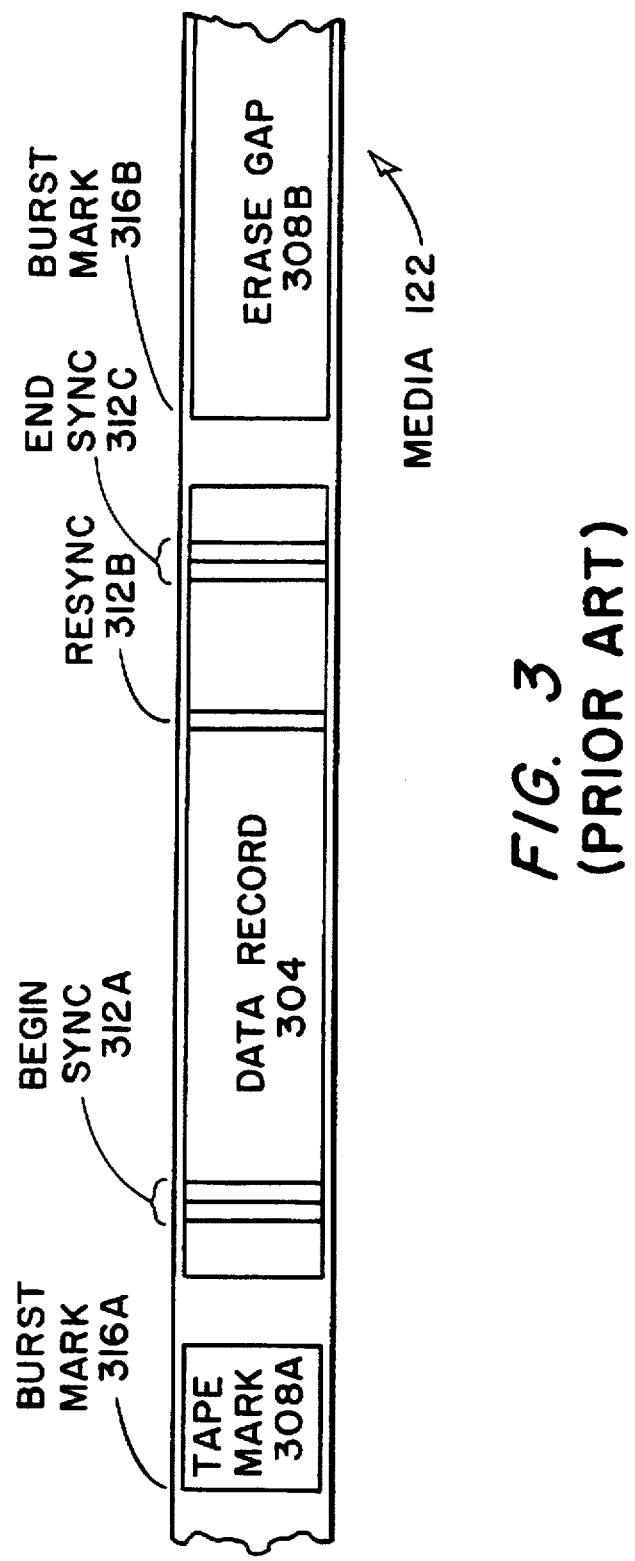
FIG. 3 is a diagram illustrating a portion of a tape media and a representative data format.

Before describing the specifics of the invention, it is helpful to first describe a representative format for a typical magnetic tape. FIG. 3 is a diagram illustrating a portion of media 122 and a representative data format. Data are written to media 122 in the form of a data record 304. The boundaries of data record 304 are marked by sync marks 312. Specifically, a begin sync mark 312A indicates the beginning of data record 304, and an end sync mark 312C marks the end of data record 304. According to this representative format, depending on the length of data record 304, re-sync marks 312B can be included periodically throughout the length of data record 304. For example, in one embodiment, a re-sync mark 312B can be included after every 994 bytes of data in data record 304.

Also illustrated in FIG. 3 are burst marks 316. Burst marks 316 are often tone marks used to mark a portion of the tape. For example, burst mark 316A indicates the presence of a tape mark 308A and burst mark 316B indicates an erase gap 308B. Data formats utilizing sync marks 312 and burst marks 316 are well known in the art, and it would be apparent to a person skilled in the relevant art how the present invention can be implemented utilizing any of a variety of tape data formats.

In this document, sync marks 312 and burst marks 316 are generally referred to as marks 312, 316.

Figure 4:
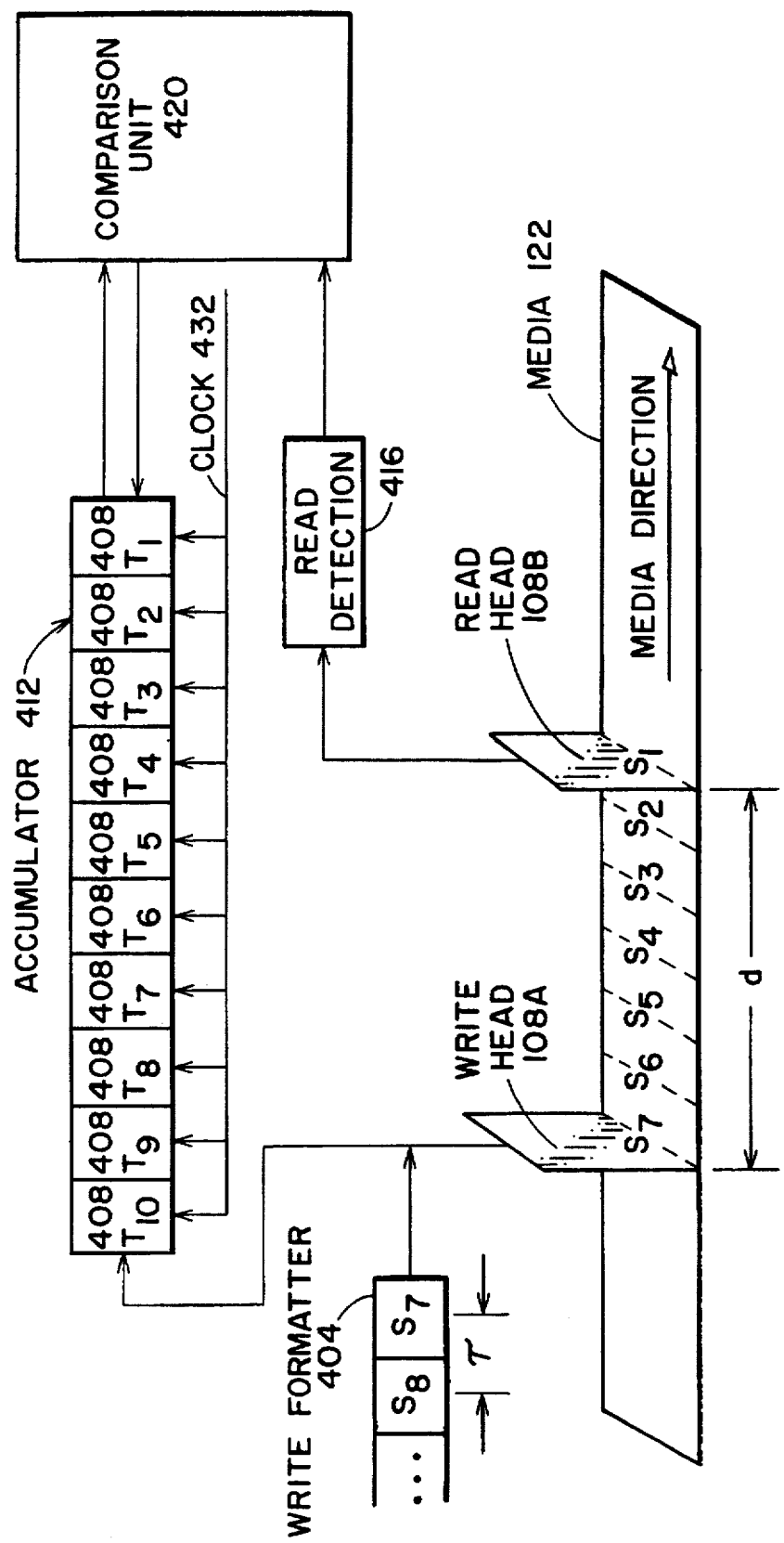
FIG. 4 is a diagram illustrating one embodiment of the present invention in the environment of a representative tape transport system.

FIG. 4 is a diagram illustrating one embodiment of the present invention. This embodiment is described in the environment of a tape transport system having a read head 108B, a write head 108A, a write formatter 404 and a read detector 416. Read head 108B and write head 108A are separated from each other by a distance d. Write formatter 404 is used to write data (e.g., record data 304) and marks (e.g., burst marks 316 and sync marks 312) to media 122. Write formatter 404 provides a mark 312, 316 to write head 108 which writes, or records, that mark 312, 316 to media 122.

At approximately the same time a mark 312, 316 is written to media 122, a timer 408 is started in accumulator 412. When the mark reaches read head 108B, it is detected by read detector 416 and provided to comparison unit 420. Comparison unit 420 reads the value of the timer 408 to determine how long it took the mark to travel from write head 108A to read head 108B. From this, the velocity of media 122 can be determined.

Accumulator 412 comprises a plurality of timers 408. In the embodiment illustrated in FIG. 4, there are 10 timers $T_1$–$T_{10}$. Also illustrated in FIG. 4 are 7 marks 312, 316 labeled $S_1$–$S_7$. In general, when mark $S_1$ is written to media 122, timer $T_1$ is triggered to start. Timer $T_1$ begins counting clock pulses 432. When mark $S_1$ is detected by read detector 416 triggering comparison unit 420, the value of timer $T_1$ is read to determine the amount of time it took for mark $S_1$ to travel from write head 108A to read head 108B. Knowing this amount of time, and the distance d traveled, the velocity of media 122 can be determined.

Similarly, when mark $S_2$ is written to media 122, a timer $T_2$ is started. In one embodiment, when timer $T_1$ is read, it is cleared and the time value stored in timer $T_2$ is shifted to timer $T_1$ and timer $T_1$ continues counting. Then, when mark $S_2$ is detected by read detector 416, comparison unit 420 reads the value stored in timer $T_1$ which is the amount of time it took for mark $S_2$ to travel from write head 108A to read head 108B.

Similarly, if mark $S_3$ is written to media 122 before mark $S_1$ is read and timer $T_1$ cleared, timer $T_3$ is started. Then, when mark $S_1$ is finally detected and timer $T_1$ cleared, the values in timers $T_3$ and $T_2$ shift to timers $T_1$ and $T_2$, respectively. As illustrated in FIG. 4, seven marks $S_1$–$S_7$ are written before mark $S_1$ is detected at read head 108B. Therefore, 7 timers $T_1$–$T_7$ are started each counting the amount of time that has elapsed since its respective mark was written to media 122.

Additional timers $T_8$–$T_{10}$ are provided in the event that the velocity of media 122 decreases such that more marks are written before the first one is read. As each mark $S_x$ is read, and its associated timer $T_x$ is read and cleared, the values in timers $T_{x+1-Tn}$ are shifted accordingly. The number of timers is chosen based on the spacing between marks $S_n$ and the distance d between heads.

Figure 5:
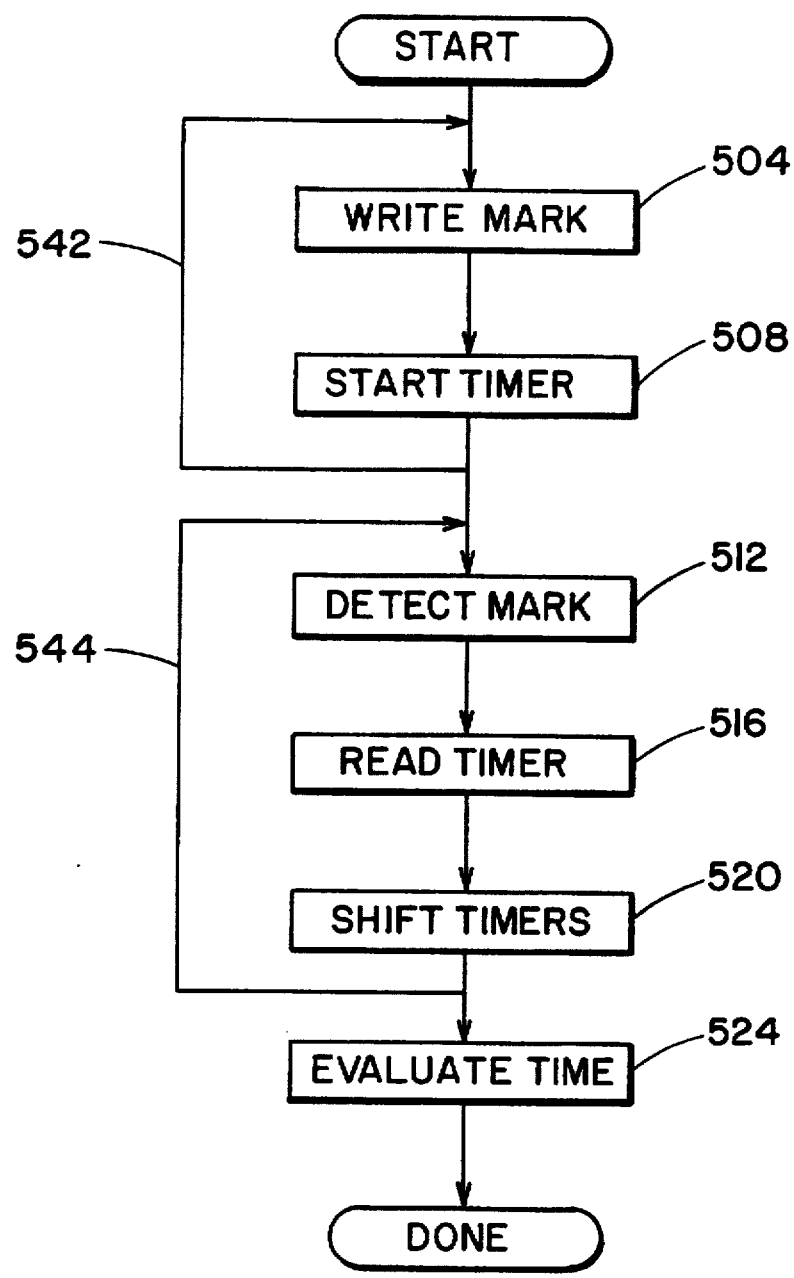
FIG. 5 is a flowchart illustrating the manner in which the velocity of the media is determined according to one embodiment of the present invention.

This embodiment is now described in greater detail with the aid of a flowchart. FIG. 5 is a flowchart illustrating the manner in which the velocity of media 122 is determined according to one embodiment of the present invention. Referring now to FIGS. 4 and 5, in a step 504 a mark $S_1$ is written to media 122. In a step 508, a timer $T_1$ is started in accumulator 412. As illustrated by flowline 542, as each subsequent mark $S_n$ is written to media 122, its corresponding timer $T_n$ is started in accumulator 412.

In a step 512, the first mark $S_1$ is detected. In response, comparison unit 420 reads timer $T_1$ in a step 516. In a step 520, timers $T_1$–$T_n$ are shifted. In a step 524, the amount of time read in step 516 is evaluated to determine the velocity of media 122. As illustrated by flow line 544, the detection of marks $S_n$, the reading of timers $T_n$, and shifting of timers $T_n$ continues each time a mark is detected and a timer is read.

Figure 6:
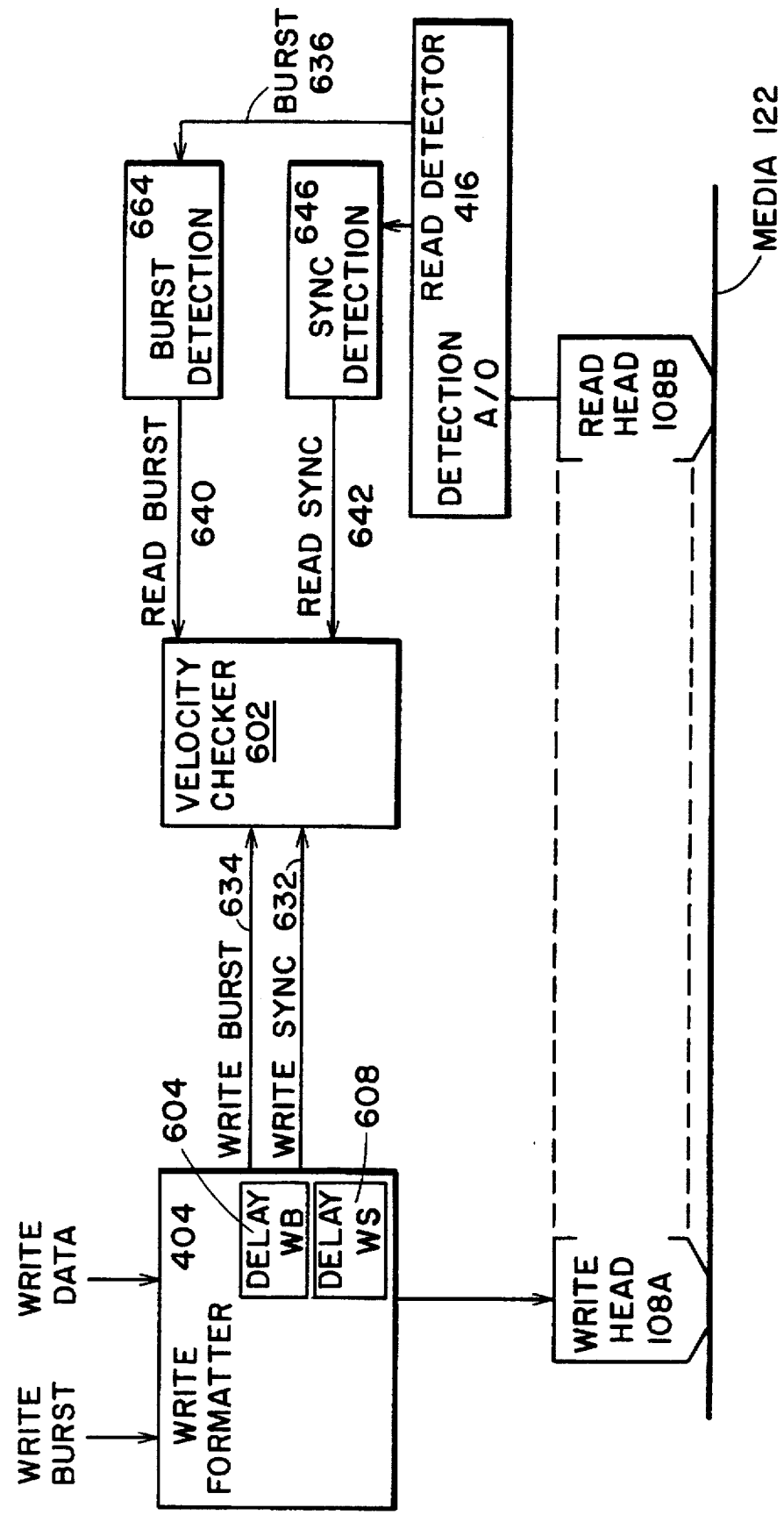
FIG. 6 is a diagram illustrating an example environment for the media velocity check system.

FIG. 6 is a diagram illustrating an example environment for the media velocity check system. Referring now to FIG. 6, the tape transport system includes a write formatter 404, a write head 108A, a read head 108B, a read detector 416, a burst mark detector 644, a sync mark detector 646, and a velocity checker 602. In one embodiment, velocity checker 602 comprises accumulator 412 and comparison unit 420 as described above with reference to FIGS. 4 and 5. A controller (not illustrated) provides burst marks 316 and data including sync marks 312 and a data record 304 to write formatter 404.

The data including marks 312, 316 are written to media 122 by write formatter 404 via write head 108A. As described above, this process results in marks 312, 316 (e.g., marks $S_1$–$S_n$) being written to media 122. For each sync mark 312 written to media 122, a write sync pulse 632 is provided to velocity checker 602. For each burst mark 316 written to media 122, a write burst pulse 634 is provided to velocity checker 602.

In one embodiment, delay elements 604, 608 are provided to delay write sync pulse 632 and write burst pulse 634 long enough to compensate for delays inherent in writing sync marks 312 and burst marks 316 to media 122. This ensures that the timers are not started too soon.

As media 122 travels in the direction indicated by arrow 606, marks 312, 316 are written by write head 108A and then are sensed by read head 108B. In response, read detector 416 generates a sync signal 638 for each sync mark 312 detected and a burst signal 636 for each burst mark 316 detected. As a result of sync signal 636, sync detector 646 generates a read sync pulse 642. Similarly, in response to burst signal 636, burst detector 644 generates a read burst pulse 640. Read sync pulse 642 and read burst pulse 640 are provided to velocity checker 602.

Velocity checker 602 uses this information to determine the velocity of media 122. In one embodiment, velocity checker 602 determines the amount of time between write sync pulse 632 and read sync pulse 642 to determine the amount of time it took for the corresponding sync mark 312 to travel from write head 108A to read head 108B. Using this time and the distance d between the heads, the velocity of media 122 is determined. In one embodiment, a simple timer is used to determine the amount of time between write sync pulse 632 and read sync pulse 642. A slightly more complex version of this embodiment is the embodiment illustrated in FIG. 4 that utilizes an accumulator 412 comprising a plurality of timers 408 to compute the time between written and detected pulses.

Figure 7:
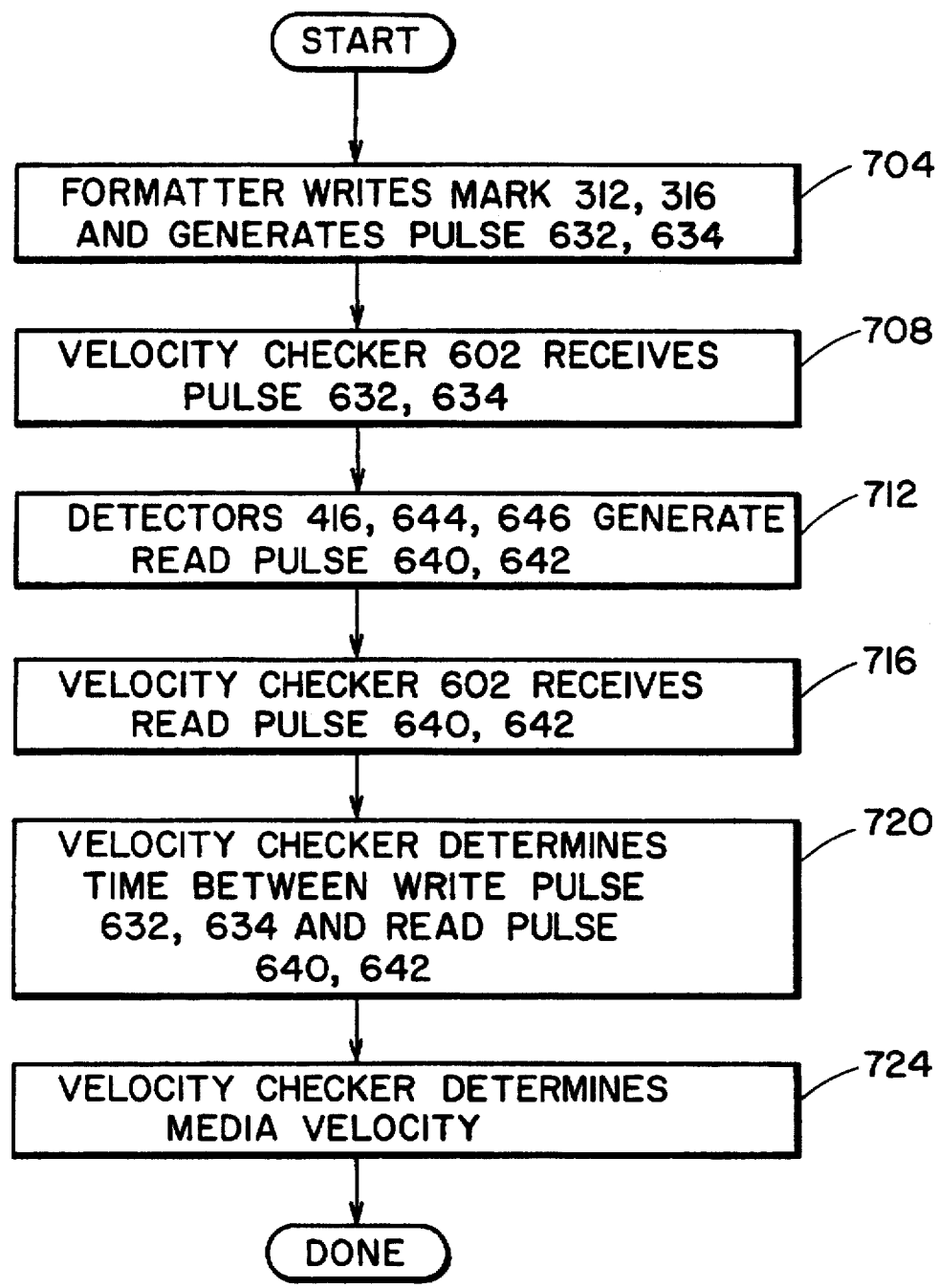
FIG. 7 is a flowchart illustrating one method by which the velocity checker according to one embodiment determines the velocity of the media in the environment illustrated in FIG. 6.

FIG. 7 is a flowchart illustrating one method by which velocity checker 602 determines the velocity of media 122 in the environment illustrated in FIG. 6. Referring now to FIG. 7, in a step 704, as data is being written to media 122 write formatter 404 writes marks 312, 316 to media 122 as discussed above; these marks can include sync marks 312 and burst marks 316. For each mark 312, 316 written to media 122, write formatter 404 also generates a pulse. A write sync pulse 632 is generated for each sync mark 312 and a write burst pulse 634 is generated for each burst mark 316. In one embodiment, pulses 632, 634 are delayed in delay units 608, 604, respectively, to compensate for the latency associated with writing marks 312, 316 to media 122. Thus, the pulse 632, 634 generated and sent to velocity checker 602 temporally coincides with the mark 312, 316 written to media 122. In an alternative embodiment, these delay elements 604 608 could be omitted and the delay compensated for by velocity checker 602 in step 720 or step 724.

In a step 708, velocity checker 602 receives the write pulse 632, 634 generated in step 704 above.

As media 122 travels across read/write head 108, the mark written in step 704 moves from write head 108A to read head 108B. In a step 712, read head 108B senses the mark 312, 316 written in step 704 and it is detected by read detector 416. For a burst mark 316, burst detector 644 generates a read burst pulse 640. For a sync mark 312, sync detector 646 generates a read sync pulse 642.

In a step 716, velocity checker 602 receives the read pulse 640, 642 generated in step 712.

In a step 720, velocity checker 602 determines the amount of time elapsed between the reception of write pulse 632, 634 and read pulse 640, 642. This time represents the actual time that it took for mark 312, 316 to travel from write head 108A to read head 108B. As discussed above, the amount of delay associated with writing mark 312, 316 to media 122 (less the delay associated with reading mark 312, 316) can be compensated for by delay elements 604, 608. Alternatively, velocity checker 602 can take this delay time into account when determining the time elapsed between write pulse 632, 634 and read pulse 640, 642.

In a step 724, velocity checker 602 determines the velocity of media 122 based on the time determined in step 720. This is a straightforward determination made by dividing the elapsed time into the distance between read head 108B and write head 108A. As discussed above, instead of delaying write pulse 632, 634 in delay elements 604, 608 the inherent system delays can be compensated for by velocity checker 602 when making the determination in this step 724.

As described above with reference to FIGS. 6 and 7, velocity checker 602 receives an indication of when a mark 312, 316 is written to media 122 and a second indication of when that mark is detected by read head 108B. Using this information and the known distance between write head 108A and read head 108B, velocity checker 602 determines velocity of media 122. Numerous embodiments can be employed to implement velocity checker 602. One such embodiment is illustrated in and described above with reference to FIG. 4.

Figure 8:
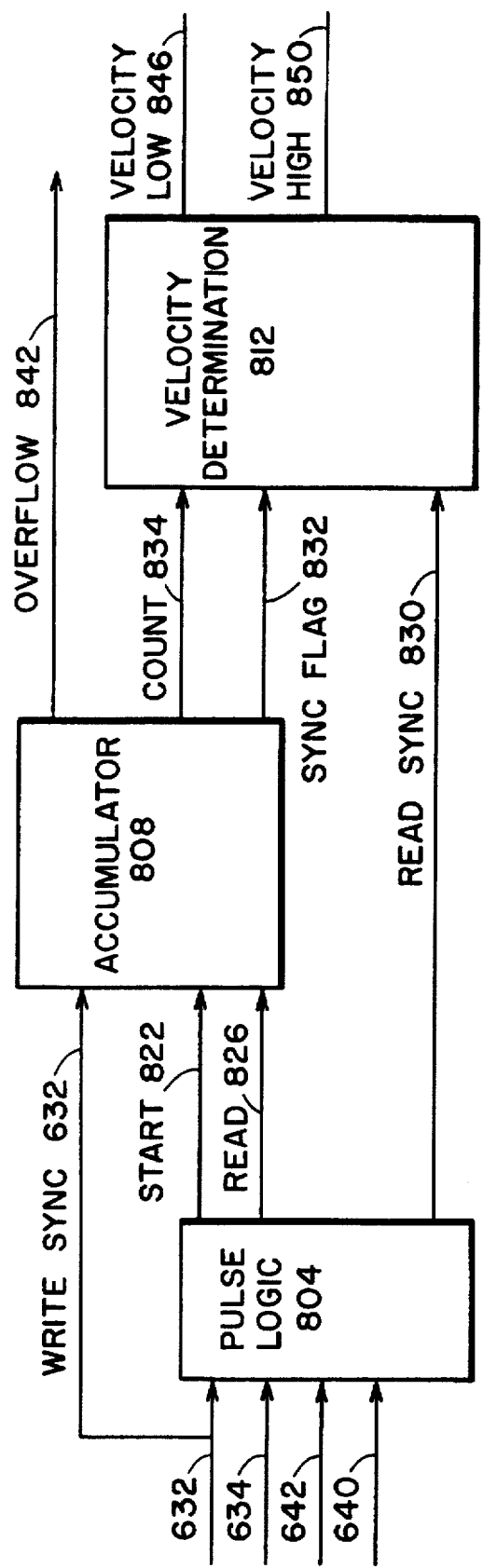
FIG. 8 is a block diagram illustrating a representative architecture of the velocity checker according to one embodiment of the invention.

A variation of this embodiment is now described. FIG. 8 is a block diagram illustrating a representative architecture of velocity checker 602 according to one embodiment of the invention. Referring now to FIG. 8, velocity checker 602 includes pulse logic 804, accumulator 808, and velocity determination logic 812. Pulse logic 804 receives write sync signal 632, write burst signal 634, read burst signal 640, and read sync signal 642.

In response to these signals, pulse logic 804 generates a start signal 822, a stop signal 826 and a read sync signal 830. Table 1, below, illustrates the action performed by pulse logic 804 in response to input signals 632, 634, 642, 640. Referring briefly to Table 1, if no signals are received, no action is taken by pulse logic 804. If a start signal is received (e.g., a write sync signal 632 or a write burst signal 634) pulse logic 804 generates a start signal 822 to start a timer and accumulator 808.

Accumulator 808 comprises a plurality of accumulator stages. These stages can be implemented as timers 408 illustrated in accumulator 412 in FIG. 4. When a write pulse is received, pulse logic 804 generates start signal 822 which instructs accumulator 808 to start a new accumulator stage (e.g., to start a new timer). When a read signal 642, 640 is received by pulse logic 804, it sends a stop signal 826 to accumulator 808 indicating that the first accumulator stage (e.g., $T_1$) should be halted. When the accumulator stage is halted, the count and value of that stage is sent to velocity determination logic 812 as count signal 834. Count signal 834 is representative of the elapsed time between when the mark was written to media 122 and when it was read from media 122.

In one embodiment, velocity determination logic 812 compares the count value 834 received from accumulator 808 with a predetermined value to determine whether the velocity is greater than or less than a specified rate. In an alternative embodiment, velocity determination logic 812 compares count value 834 to determine whether it falls within a range of values. If count value 834 is above this range, a velocity low signal 846 is generated indicating that the speed of media 122 is below the acceptable range. If, on the other hand, count value 834 is below this range, a velocity high signal 850 is generated indicating that the velocity of media 122 is greater than expected.

In still another embodiment, velocity determination logic 812 can be replaced with a lookup table or an analog-to-digital converter to provide the media velocity represented by count value 834.

Pulse logic 804 also generates a read sync signal 830. An active read sync signal 830 indicates that the count signal 834 received by velocity determination logic 812 is in response to a read sync signal 642 as opposed to a read burst signal 640.

Figure 9:
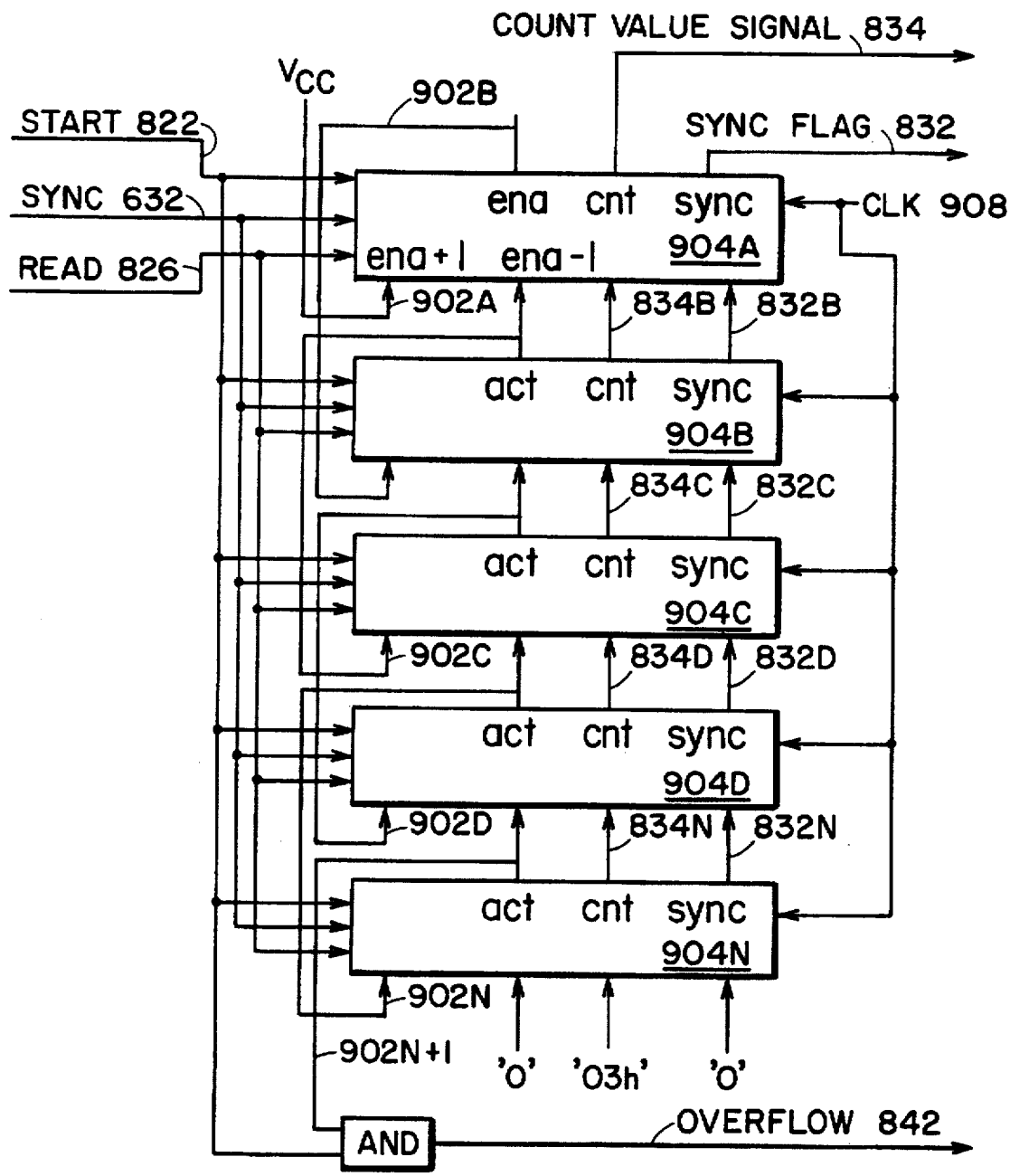
FIG. 9 is a block diagram illustrating a representative architecture of an accumulator according to one embodiment of the invention.

One embodiment of accumulator 808 is now described in greater detail. FIG. 9 is a block diagram illustrating a representative architecture of accumulator 808 according to one embodiment of the invention. Referring now to FIG. 9, accumulator 808 can include a plurality of accumulator stages 904A through 904N. Each accumulator stage 904 essentially performs an accounting function that is triggered upon receipt of start signal 822 and stopped upon receipt of stop signal 826. In one embodiment, accumulator stages 904 count rising or falling edges of a clock signal 908.

In general, when a start signal 822 is received, an accumulator stage 904 begins counting. At this time, it sets an enable signal 902 active indicating to the next accumulator stage 904 that that next stage will begin counting upon receipt of the next start signal 822. Upon receipt of a stop signal 826, the first accumulator stage 904A stops counting and outputs a count value 834 to velocity determination logic 812 indicating the value reached by that accumulator stage 904A. At the same time, the value in each subsequent accumulator stage 904 is shifted up to the previous accumulator stage 904 and the counting continues.

Figure 10:
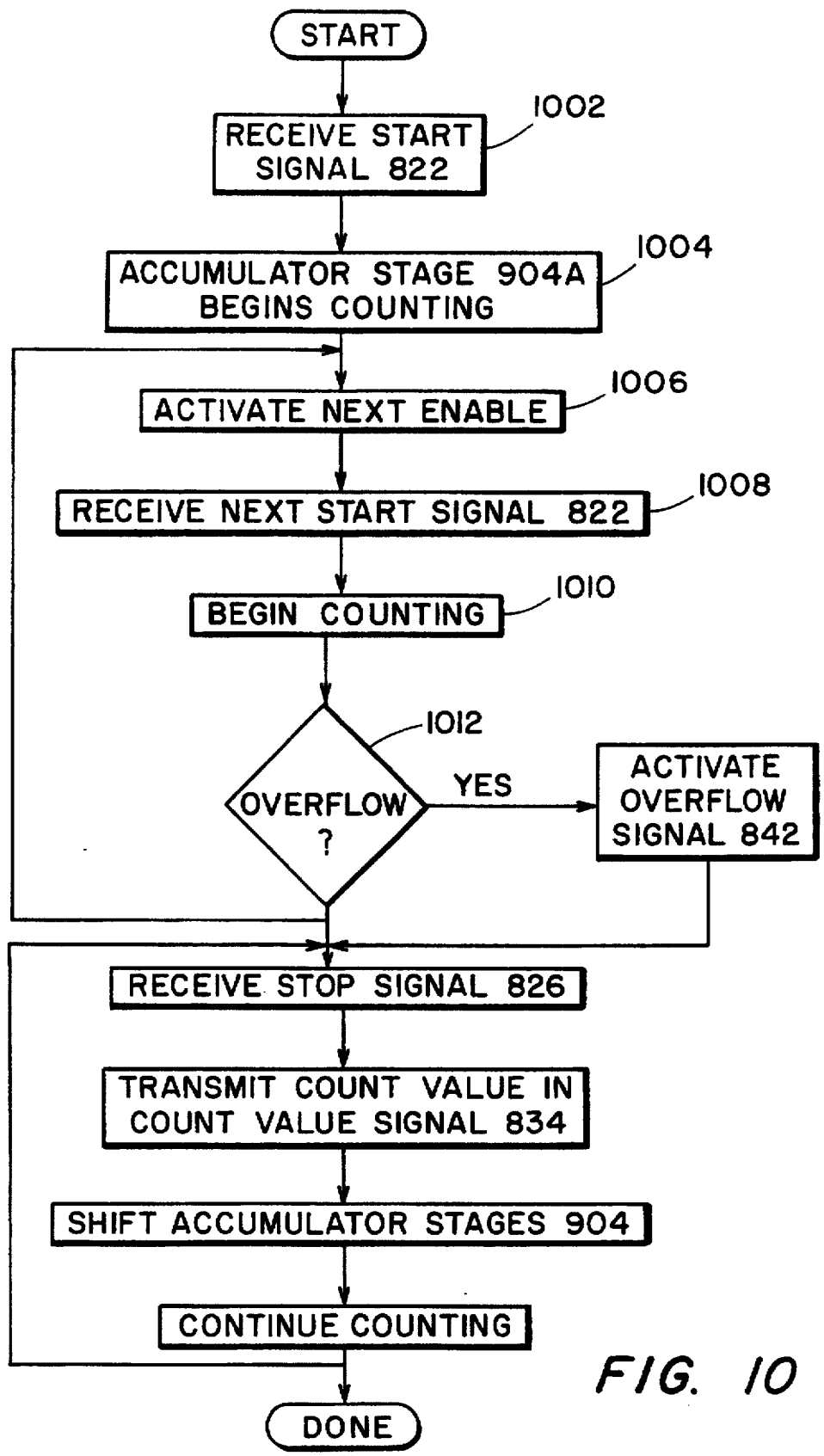
FIG. 10 is a flowchart illustrating the manner in which a count value is determined for each mark written to and read from media.

This operation of accumulator 808 is now described in greater detail with the aid of FIG. 10. FIG. 10 is a flowchart illustrating the manner in which a count value 834 is determined for each mark written to and read from media 122. Referring now to FIGS. 9 and 10, assume an initial condition where no start signals 822 have been received and each accumulator stage 904 is in a wait state. The first accumulator stage 904A is enabled by the presence of an active enable signal 902A. In the embodiment illustrated in FIG. 9, enable signal 902 is an active high signal.

In a step 1002, start signal 822 is received by accumulator 808. In this embodiment, start signal 822 is present at each accumulator stage 904A-904N. However, start signal 822 only affects the accumulator stage 904 that is enabled by an active enable signal 902. Thus, in a step 1004 accumulator stage 904A (having an active enable signal 902A) begins counting in response to start signal 822.

In a step 1006, when accumulator stage 904A begins counting, it activates enable signal 902B. Enable signal 902B which is now active, enables accumulator stage 904B so that upon receipt of the next start signal 822 stage 904B begins counting. This is illustrated by steps 1008 and 1010. Steps 1006 through 1010 are repeated each time a new start signal 822 is received by accumulator 808. Thus, for each mark 312, 316 written to media 122 a new accumulator stage 904 begins counting.

When the last accumulator stage 904N is started by start signal 822, enable signal 902N+1 is activated. If a new start signal 822 is received and enable signal 902N+1 is currently active, an overflow signal 842 is set active. This is illustrated by steps 1012 and 1014. As long as accumulator 808 is not in an overflow state, steps 1006 through 1010 are repeated so that a new accumulator stage 904 begins counting for each new start signal 822 received. This is illustrated by flow line 1062.

Steps 1002 through 1014 describe the events that occur in response to receipt of a start signal 822. The following steps describe what happens when a stop signal 826 is received. In a step 1020, accumulator 808 receives a stop signal 826. Stop signal 826 causes accumulator 904A to shift out its counted value as count value signal 834. Count value signal 834 is sent to velocity determination logic 812. This occurs in a step 1024.

In a step 1028, the respective count values in each subsequent accumulator stage 904 are shifted to the previous accumulator stage 904. For example, count value 834B in accumulator stage 904B is shifted to accumulator stage 904A and count value 834C in accumulator stage 904C is shifted to accumulator stage 904B. Active accumulator stages 904 continue counting as illustrated by step 1032.

When the next stop signal 826 is received by accumulator 808, the count value in accumulator stage 904A is again sent to velocity determination logic 812 and the count values of subsequent accumulator stages 904 are shifted and the counting continues. In other words, steps 1020 through 1032 are repeated each time a stop signal is received as illustrated by flow line 1062.

This operation is now described in terms of a simple scenario. In this scenario, three sync marks 312 ($S_1$, $S_2$, and $S_3$) are written to a media 122 before the first mark 312 ($S_1$) is read from the tape. In this scenario, the first mark $S_1$ starts the first accumulator stage 904A. Enable signal 902B activates accumulator stage 904B so that upon receipt of start signal 822 indicating mark $S_2$ has been written to the tape, accumulator stage 904B begins counting.

Enable signal 902C is now active, enabling accumulator stage 904C. Therefore, when mark $S_3$ results in a start signal 822, accumulator stage 904C begins counting. In this scenario, before any subsequent marks (e.g., $S_4$) are written to media 122, the first mark $S_1$ is read from media 122. As a result, accumulator stage 904A outputs its count value as count value signal 834. Accumulator stage 904B shifts its count value to accumulator stage 904A and accumulator stage 904C shifts its count value to accumulator stage 904B. At this time accumulator stages 904A and 904B continue counting until the next stop signal 826 is received. If another start signal 822 is received (because $S_4$ was written to media 122) accumulator stage 904C is activated. When the next read signal 826 is received (corresponding to the reading of mark $S_2$) the count value in accumulator stage 904A is output as count value signal 834, and each subsequent count value is shifted to the previous accumulator stage. Thus, a count value is maintained for each mark 312, 316 ($S_N$) written to media 122.

An additional feature of accumulator 808 is its ability to keep track of a flag indicating whether the mark written was a sync mark 312 or a burst mark 316. This is accomplished by providing write sync signal 632 to accumulator 808. An indication of whether this signal is active or not (i.e., whether the flag is set or not) is stored in accumulator stage 904. In one embodiment, a bit is set in accumulator stage 904 if sync signal 632 is active. When the count value is shifted or provided to velocity determination logic 812 this bit is sent as sync flag 832 as well. This is used to track whether the relevant count value is for a sync mark 312 or a burst mark 316.

As described above, receipt of a start pulse starts an accumulator stage counting and receipt of a stop pulse provides the count value to the comparison logic and shifts the values in subsequent counters. These actions are summarized in Table 1.

TABLE 1

| Write | Read | Action |
|---|---|---|
| 0 | 0 | No action |
| 1 | 0 | Start new accumulator stage |
| 0 | 1 | Stop and evaluate count shift stages |
| 1 | 1 | Start new stage, evaluate and shift |

Referring now to Table 1, if no write or read signals are received, no action is taken. If, on the other hand, a write signal 632, 634 is received, the start signal 822 is generated which causes a new accumulator stage 904 in accumulator 808 to begin counting. When a read signal 642, 640 is received by pulse logic 804, the count value in accumulator stage 904A is forwarded to velocity determination logic 812 and the values in the subsequent stages are shifted forward one counter. Finally, if both a read signal 632, 634 and a write signal 642, 640 are received at the same time, a new stage 904 must begin counting, the count value in accumulator stage 904A must be provided to velocity determination logic 812, and the values in all subsequent accumulator stages are shifted forward one stage.

Figure 11:
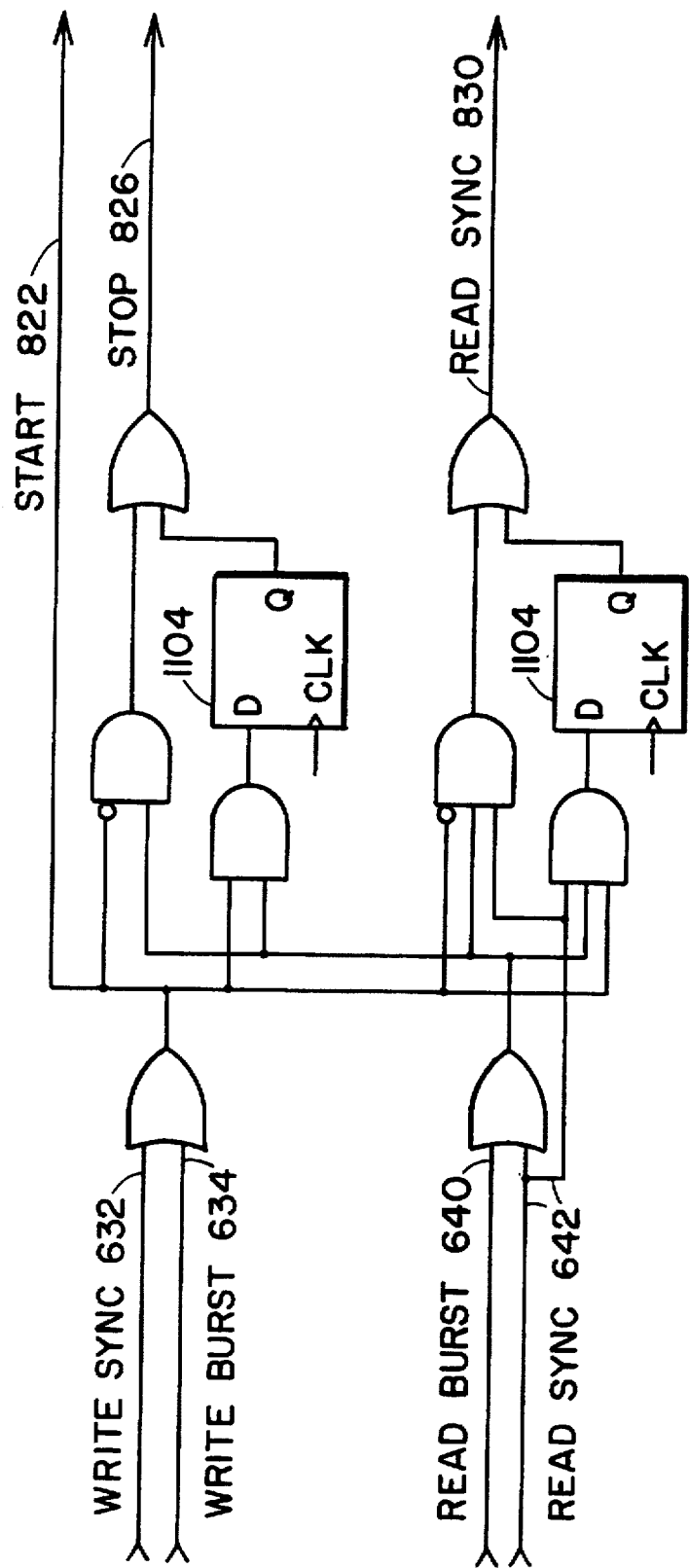
FIG. 11 is a logic diagram illustrating one possible representative embodiment of pulse logic.

There are numerous embodiments of pulse logic 804 that could be implemented to generate start signal 822, stop signal 826, and read sync signal 830 to accomplish the objectives summarized in Table 1. FIG. 11 is a logic diagram illustrating one possible representative embodiment of pulse logic 804. According to this embodiment, start signal 822 is generated upon receipt of either a write sync signal 632 or a write burst signal 634. Read sync signal 830 is only generated when the mark read from media 122 is a sync mark 312 resulting in read sync signal 642.

Flip-flops 1104 are provided so that if a read and a write signal are provided simultaneously to pulse logic 804 (i.e., if the last row of Table 1 occurs), stop signal 826 and read sync signal 830 are not generated until the occurrence of the appropriate clock edge on flip-flops 1104.

Figure 12:
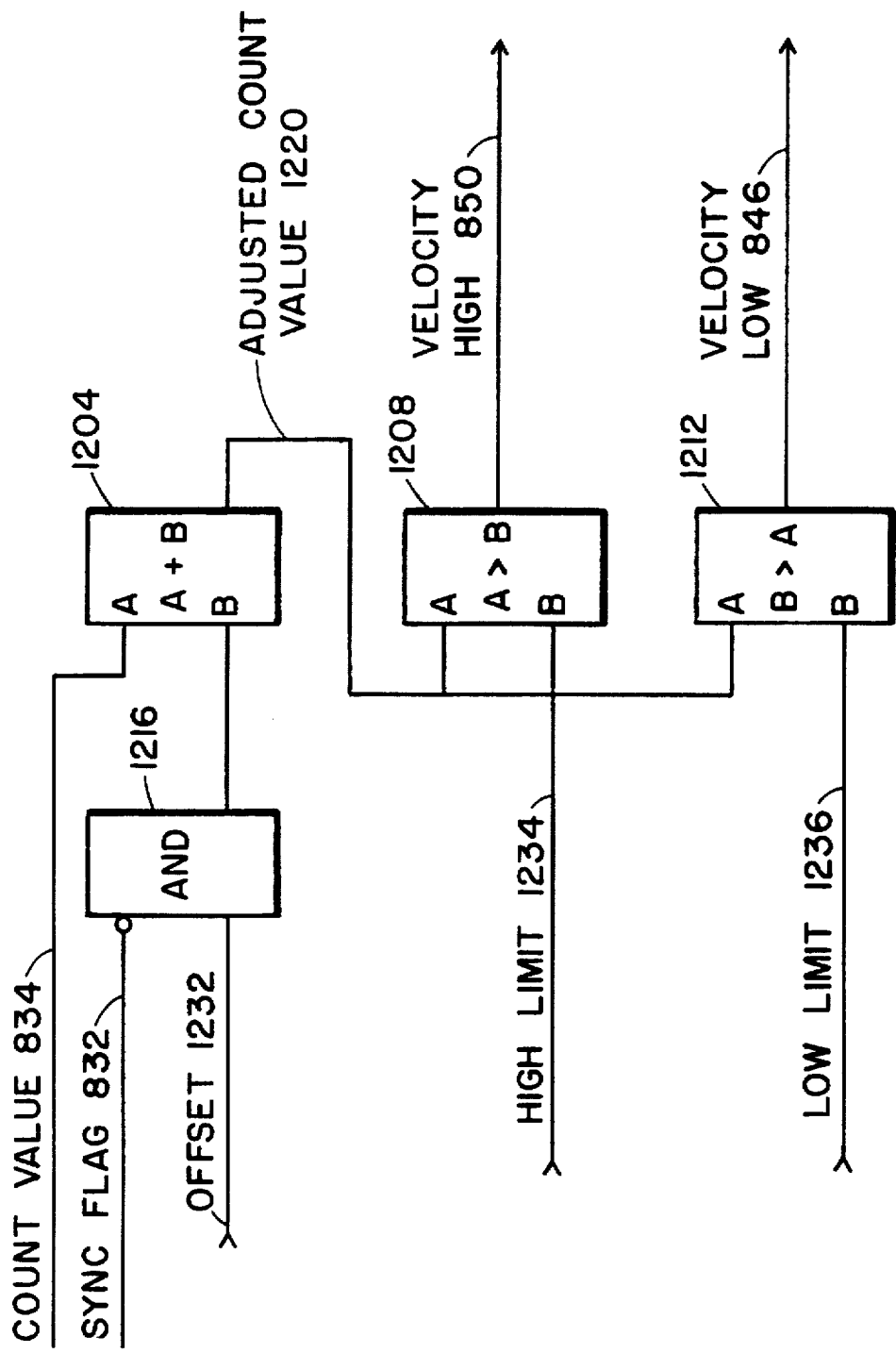
FIG. 12 is a schematic diagram illustrating a representative architecture for velocity determination logic according to one embodiment of the invention.

FIG. 12 is a schematic diagram illustrating a representative architecture for velocity determination logic 812 according to one embodiment of the invention. Velocity determination logic 812 includes an adder 1204, comparators 1208, 1212, and an AND block 1216. Because there is a greater latency associated with the receipt of read burst signal 640, an offset 1232 is added to count value 834 for calculations involving burst marks 316. In this scenario, AND block 1216 is activated by an inactive sync flag 832. Thus, when dealing with a burst mark 316, sync flag 832 is inactive and offset 1232 is passed through AND block 1216 to input port B of adder 1204. This adds offset value 1232 to count value 834 to arrive at an adjusted count value 1220. For the case of a write sync signal, offset 1232 is not provided to AND block 1204 and adjusted count value 1220 is equal to count value 834.

Adjusted count value 1220 is compared with a high limit value 1234 in comparator 1208 and a low limit value 1236 in comparator 1212. If adjusted count value 1220 is greater than high limit value 1234 a velocity high signal 850 is active. If adjusted value 1220 is less than low limit value 1236 a velocity low signal 846 is active. Thus, according to this embodiment, it can be determined whether the velocity of media 122 is within a specified range by monitoring velocity high signal 850 and velocity low signal 846. If either velocity high signal 850 or velocity low signal 846 is active, this indicates that the velocity of media 122 is out of range.

Velocity high signal 850 and velocity low signal 846 can be provided to a number of devices for recording, monitoring, and/or correcting velocity of media 122. Velocity high signal 850 and velocity low signal 846 can be used to trigger alarms, provide feedback to a motor controller, be logged on a recording device, or otherwise used in a number of like ways to best suit the given application.

Offset 1232, high limit 1234, and low limit 1236 can be provided in a variety of different ways. For example, they can be hard-wired switch settings, or they can be generated by a processor.

Figure 13:
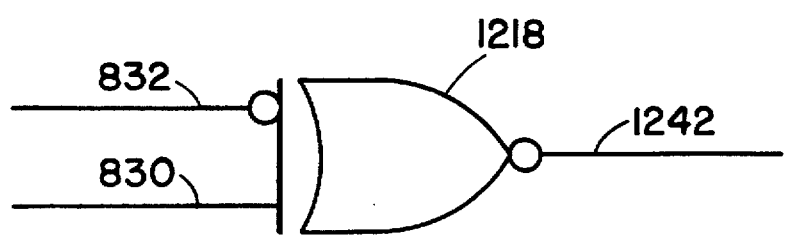
FIG. 13 is a schematic diagram illustrating a representative architecture for an EXCLUSIVE-NOR function according to one embodiment of the invention.

In one embodiment, velocity determination logic 812 also includes an EXCLUSIVE-NOR function 1218, as depicted in FIG. 13.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of detecting a velocity of a tape in a tape transport system having a write head and a read head separated by a known distance, comprising the steps of:
   (a) receiving a write signal indicating when a discrete mark is written to the tape by the write head;
   (b) receiving a read signal indicating when said discrete mark is read from the tape by the read head;
   (c) determining the time between receipt of said write signal and said read signal, comprising the steps of
      i. starting a first accumulator stage on receipt of a first write signal to generate a count value,
      ii. when a first read signal is received, reading said count value generated by said first accumulator stage, and
      iii. when a second write signal is received before said first read signal,
         starting a second accumulator stage on receipt of a second write signal to generate a second count value;
         shifing said second count value from said second accumulator stage to said first accumulator stage upon receipt of said first read signal, and reading said second count value from said first accumulator stage upon receipt of a second read signal; and (d) determining the velocity of the tape based on said time determined in step (c) and the known distance between said write head and said read head.

2. The method of claim 1, further comprising the step of sending an enable signal from said first accumulator stage to said second accumulator stage when said first accumulator stage is started.

3. The method of claim 1, wherein said step (c) further comprises the steps of:

iv. starting a next accumulator stage on receipt of a subsequent write signal to generate a next count value;

v. reading said first accumulator stage upon receipt of a read signal; and vi. shifting said next count value from said next accumulator stage to a previous accumulator stage upon receipt of said read signal.

4. The method of claim 3, wherein said step (c) further comprises the step of generating an error signal when said subsequent write signal is received and there is no accumulator stage available to generate said next count value.

5. The method of claim 1, further comprising the steps of:

iv. generating a sync flag indicating whether a given discrete format mark written to the tape and corresponding to a given write signal is a sync mark;

v. storing said sync flag in said accumulator stage started by said given write signal;

vi. shifting said sync flag with said count value; and vii. reading said sync flag when said count value is read in response to a read signal.

6. The method of claim 5, further comprising the steps of:

viii. generating a read sync signal indicating whether a given read signal indicates said discrete format mark read from the tape is a sync mark; and ix. generating an error signal when said sync flag read with said count value indicates said given discrete format mark written is a sync mark and said read sync signal indicates that said discrete mark read from the tape is not a sync mark; and when said sync flag read with said count value indicates said given discrete format mark written is not a sync mark and said read sync signal indicates that said discrete format mark read from the tape is a sync mark.

7. An apparatus for detecting a velocity of a tape in a tape transport system having a write head and a read head separated by a know distance and formatting the tape using discrete marks, the tape transport system generating a write signal indicating when one of the discrete marks is written to the tape by the write head and a read signal indicating when one of the discrete marks is read from the tape by the read head, comprising:

velocity detection means for determining the velocity of the tape; and accumulator means for determining the amount of time between the write signal and the read signal, comprising a first accumulator stage for generating a first count value in response to a first write signal and for providing said first count value to said velocity detection means in response to a first read signal, a second accumulator stage, coupled to said first accumulator stage, for generating a second count value in response to a second write signal when said second write signal is received before said first read signal, means for shifting said second count value from said second accumulator stage to said first accumulator stage upon receipt of said first read signal, and means for providing said second count value to said velocity detection means upon receipt of a second read signal; and wherein the determination of the velocity of the tape by said velocity detection means is based on said time determined by said accumulator means and the known distance between said write head and said read head.

8. The apparatus of claim 7, wherein said accumulator means further comprises means for sending an enable signal from said first accumulator stage to said second accumulator stage when said first accumulator stage is started.

9. The apparatus of claim 7, wherein said accumulator means further comprises:

means for starting a next Accumulator stage on receipt of a subsequent write signal to generate a next count value;

means for providing said count value of said first accumulator stage to said velocity detection means upon receipt of a read signal; and means for shifting said next count value from said next accumulator stage to a previous accumulator stage upon receipt of said read signal.

10. The apparatus of claim 7, wherein said accumulator means further comprises means for generating an error signal when said subsequent write signal is received and there is no accumulator stage available to generate said next count value.

11. The apparatus of claim 7, further comprising:

means for generating a sync flag indicating whether a given discrete format mark written to the tape and corresponding to a given write signal is a sync mark;

means for storing said sync flag in said accumulator stage started by said given write signal;

means for shifting said sync flag with said count value; and means for providing said sync flag to said velocity detection means when said count value is provided to said velocity detection means in response to a read signal.

12. The apparatus of claim 11, further comprising:

means for generating a read sync signal indicating whether a given read signal indicates said discrete format mark read from the tape is a sync mark; and means for generating an error signal when said sync flag read with said count value indicates said given discrete format mark written is a sync mark and said read sync signal indicates that said discrete mark read from the tape is not a sync mark; and when said sync flag read with said count value indicates said given discrete format mark written is not a sync mark and said read sync signal indicates that said discrete format mark read from the tape is a sync mark.

13. A velocity detector for determining the velocity of a tape in a tape transport system, comprising:

pulse logic means for detecting a write signal and a read signal, and for generating a start signal and a stop signal, wherein said write signal indicates the writing of a discrete mark to the tape and said read signal indicates the reading of a discrete mark from the tape;

velocity detection means for determining the velocity of the tape; and accumulator means for receiving said start signal and said stop signal from said pulse logic means and for generating a count value indicating the amount of time between receipt of said start signal and said stop signal, comprising a first accumulator stage for generating a first count value in response to a first start signal and for providing said first count value to said velocity detection means in response to a first stop signal, a second accumulator stage, coupled to said first accumulator stage, for generating a second count value in response to a second start signal when said second stop signal is received before said first read signal, means for shifting said second count value from said second accumulator stage to said first accumulator stage upon receipt of said first stop signal, and means for providing said second count value to said velocity detection means upon receipt of a second stop signal; and wherein the determination of the velocity of the tape by said velocity detection means is based on said count value.

14. The apparatus of claim 13, wherein said accumulator means further comprises:

means for stating a next accumulator stage on receipt of a subsequent start signal to generate a next count value;

means for providing said count value of said first accumulator stage to said velocity detection means upon receipt of a stop signal; and means for shifting said next count value from said next accumulator stage to a previous accumulator stage upon receipt of said stop signal.

15. A velocity detector for detecting the velocity of a tape in a tape transport system, the tape transport system having a write head and a read head separated by a known distance, a write formatter for writing discrete format marks to format data being written to the tape, and a read detector, comprising:

an accumulator comprising two timers, wherein each of said timers generates a count value, wherein a first of said timers is started when a first start signal indicating that a discrete format mark is being written to the tape is received from the write formatter, and a second of said timers is started when a second start signal is received; and velocity detector means for reading said count value in said first timer and shifting said count value in said second timer into said first timer when a first read signal is received from the read detector indicating a discrete format mark has been read from the tape and for determining the velocity of the tape based on said count value read from said first timer and the known distance.

16. A tape transport system comprising:

a write head and a read head separated by a known distance;

a write formatter coupled to said write head for writing data and discrete marks to a magnetic tape, and for generating a write signal indicating when a discrete mark is written to the tape;

a detector coupled to said read head for generating a read signal indicating when a discrete mark is detected on said tape;

velocity detection means for determining the velocity of the tape;

accumulator means coupled to said write formatter and said velocity detection means for determining the amount of time between the write signal and the read signal, comprising a first accumulator stage for generating a first count value in response to a first write signal and for providing said first count value to said velocity detection means in response to a first read signal;

a second accumulator stage, coupled to said first accumulator stage, for generating a second count value in response to a second write signal when said second write signal is received before said first read signal;

means for shifting said second count value from said second accumulator stage to said first accumulator stage upon receipt of said first read signal; and means for providing said second count value to said velocity detection means upon receipt of a second read signal; and wherein the determination of the velocity of the tape by said velocity detection means is based on said time determined by said accumulator means and said known distance between said write head and said read head.

17. The apparatus of claim 16, wherein said accumulator means further comprises means for sending an enable signal from said first accumulator stage to said second accumulator stage when said first accumulator stage is started.

18. The apparatus of claim 16, wherein accumulator means further comprises:

means for starting a next accumulator stage on receipt of a subsequent write signal to generate a next count value;

means for providing said count value of said first accumulator stage to said velocity detection means upon receipt of a read signal; and means for shifting said next count value from said next accumulator stage to a previous accumulator stage upon receipt of said read signal.

19. The apparatus of claim 16, further comprising:

means for generating a sync flag indicating whether a given discrete format mark written to the tape and corresponding to a given write signal is a sync mark;

means for storing said sync flag in said accumulator stage started by said given write signal;

means for shifting said sync flag with said count value; and means for providing said sync flag to said velocity detection means when said count value is provided to said velocity detection means in response to a read signal.

20. The apparatus of claim 19, further comprising:

means for generating a read sync signal indicating whether a given read signal indicates said discrete format mark read from the tape is a sync mark; and means for generating an error signal when said sync flag read with said count value indicates said given discrete format mark written is a sync mark and said read sync signal indicates that said discrete format mark read from the tape is not a sync mark; and when said sync flag read with said count value indicates said given discrete format mark written is not a sync mark and said read sync signal indicates that said discrete format mark read from the tape is a sync mark.

* * * * *